United States Patent [19]

Hansen

[11] 4,257,624
[45] Mar. 24, 1981

[54] EXTENDIBLE STEERING COLUMN

[75] Inventor: Kenneth N. Hansen, Waukesha, Wis.

[73] Assignee: Allis-Chalmers Corporation, Milwaukee, Wis.

[21] Appl. No.: 972,464

[22] Filed: Dec. 22, 1978

[51] Int. Cl.³ .............................................. B62D 1/18
[52] U.S. Cl. ...................................... 280/775; 74/493; 411/25; 411/79; 180/132; 403/22; 403/104; 403/109; 403/374
[58] Field of Search ....................... 280/775, 777, 779; 74/493; 180/132; 403/104, 109, 374, 341, 22; 85/67, 79

[56] References Cited

U.S. PATENT DOCUMENTS

| | | | |
|---|---|---|---|
| 2,444,919 | 7/1948 | Cotton | 403/341 |
| 3,258,987 | 7/1966 | Zeigler | 74/493 |
| 3,273,444 | 9/1966 | Houvener | 85/79 |
| 3,791,223 | 2/1974 | Treichel | 74/493 |
| 3,881,366 | 5/1975 | Bradley | 74/493 |

Primary Examiner—John P. Silverstrim
Attorney, Agent, or Firm—Arthur L. Nelson

[57] ABSTRACT

An extendible and pivotal steering column for a vehicle having a wedge lock extension mechanism for providing an extension and pivotal arrangement of the upper end of the steering column pivotally mounted within the operator station of the vehicle.

10 Claims, 5 Drawing Figures

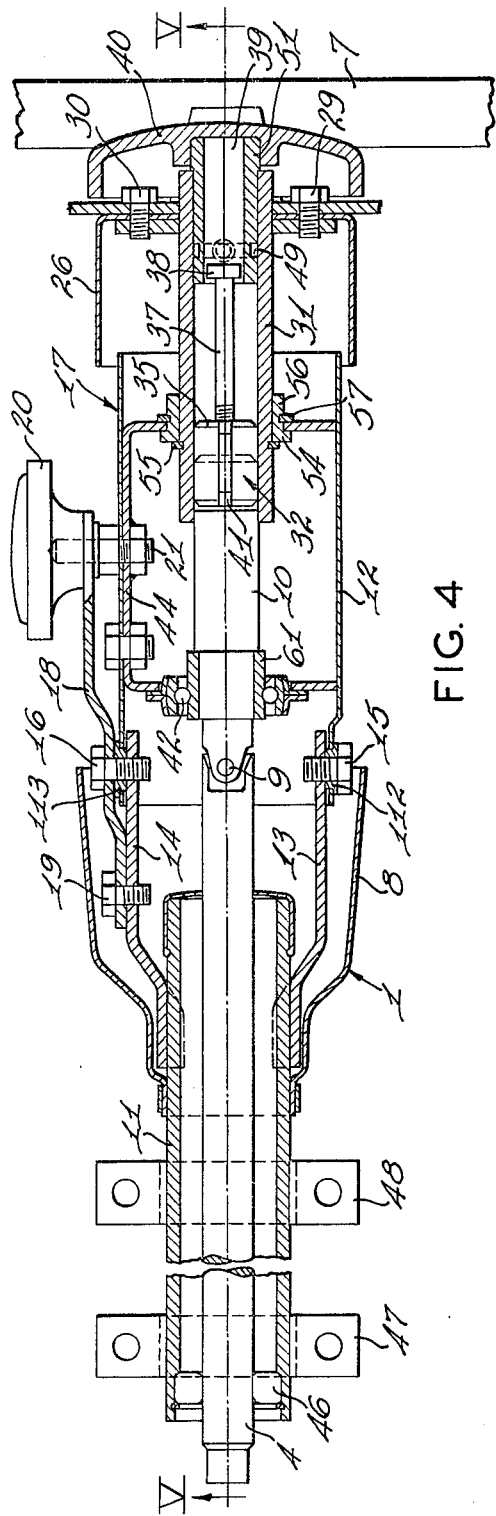
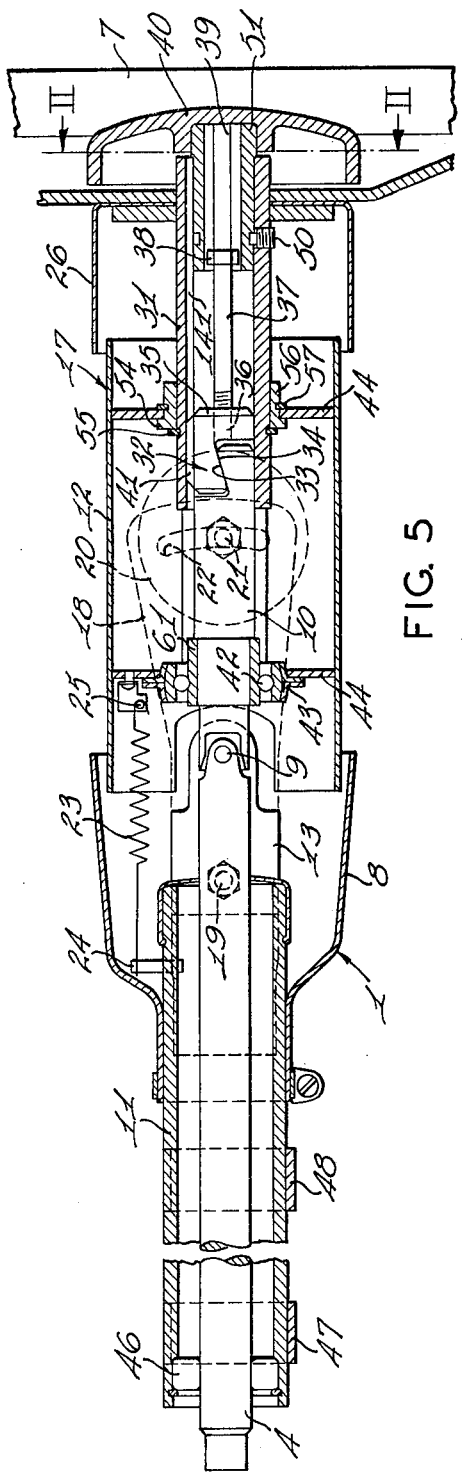
FIG. 4
FIG. 5

EXTENDIBLE STEERING COLUMN

This invention relates to a steering mechanism and more particularly to a pivotal steering column with a portion pivoted within the cab of the vehicle through an infinite number of positions and a wedge lock in the steering column to selectively extend and contract the steering column and lock in an infinite number of positions to provide convenience for the operator.

Steering columns on motor vehicles are provided with a pivotal arrangement to pivotally raise and lower and extend or contract the steering column for positioning the steering wheel to the convenience of the operator. Steering mechanisms on the larger tractors require a hydraulic motor to drive the steering mechanism which is controlled by the steering wheel. The effort on the steering wheel is assisted by a hydraulic motor to drive the steering of the vehicle. Since the steering motor is driven hydraulically, which may cause heating and produce vibrations, it is objectionable within the vehicle cab. This invention provides for a stationary lower portion of a steering column which extends through the firewall to control the hydraulic motor for driving the steering mechanism on the vehicle. Extending within the cab the stationary portion is pivotally connected to the upper pivotal portion carrying the steering wheel. A convenient manually operated pivotal mechanism is provided for infinite positioning of the steering column as it is pivoted upwardly and downwardly. Also, a cap is provided on the end of the steering column centrally located with the steering wheel to selectively release and lock the extension mechanism to extend or contract the steering column to the convenience of the operator.

Accordingly, it is an object of this invention to provide a pivotal and extensible steering column.

It is another object of this invention to provide a pivotal steering column with an extendible and locking mechanism operated by the cap on the steering column mounted concentrically with the steering wheel.

It is a further object of this invention to provide a pivotal steering column with a wedge lock operated by a bolt on the cap of the steering wheel to selectively lock and release the wedge lock arrangement in the steering column to extend and contract the steering column and means to pivotally raise and lower the steering wheel for positioning of the steering wheel to accommodate the operator.

The lower portion of the steering column extends through the firewall and is adapted for operating a hydraulic motor of the steering mechanism in the engine compartment.

The pivotal portion and the extension mechanism of the steering column are located in the upper portion of the steering column and conveniently located for operation by the operator. The cap centrally located on the steering column operates a wedge lock for releasing and locking of the steering column to accommodate extension and contraction of the steering column.

Referring to the drawings, the preferred embodiment of this invention is illustrated.

FIG. 4 is a cross section view taken on line IV—IV of FIG. 1.

FIG. 5 is a cross section view taken on line V—V of FIG. 4.

Figure 1:
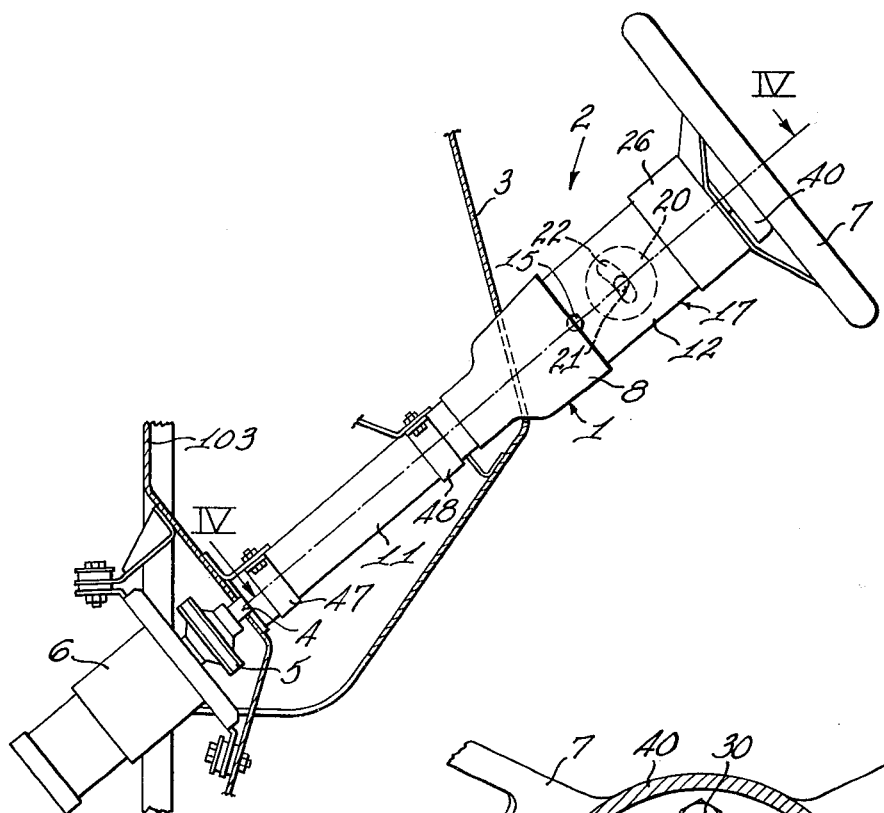
FIG. 1 is a side elevation view of a steering column, a pivotal support and the locking arrangement.

The stationary portion 1 of the steering column 2 is mounted on the firewall 103 and instrument panel 3. The shaft 4 drives into a coupling 5 which in turn is connected to a hydraulic motor 6 which includes a control valve responsive to directional steering of the steering wheel 7. The stationary portion 1 includes the casing 8 enclosing the shaft 4 which is connected through a universal joint 9 to the shaft 10. The casing 8 is fastened to the sleeve 11 which in turn is fastened to the firewall 103. The housing 12 is pivotally connected to the supports 13 and 14 by means of the pivotal bolts 15 and 16. Bolts 15 and 16 extend through the housing 12 and bushings 112 and 113 of the upper portion 17 of the steering column. The locking arm 18 is fastened by the bolt 19 to the support 14. The knob 20 locks the arm 18 and the upper steering column mechanism 17 in the selected pivotal position.

The stud 21 is tightened by the knob 20 and moves through the slot 22 to the selected position as the upper portion 17 of the steering column is pivoted.

To facilitate pivoting of the steering column, the spring 23 connected between the pin 24 and the key 25 is under tension to assist in raising of the upper portion of the steering column as it is pivoted.

The housing 12 of the upper portion of the steering column 17 extends within the cup 26 fastened to the steering wheel 7 by means of the bolts 28, 29 and 30. A quill shaft 31 is welded to the steering wheel 7. The quill shaft 31 reciprocates relative to the cam shaft 10 in a normal operating position when the lock mechanism 32 is released. The lock mechanism includes a cam surface 33 on the cam shaft 10 which engages an inclined surface 34 on the wedge 35. The wedge 35 has a threaded opening 36 which receives the threaded end of the bolt 37. A hex head 38 of the bolt 37 is received in a hexagonal elongated opening 39 in the center portion of sleeve 51. The cap 40 is integral with the sleeve 51 and moves with the steering wheel 7 as the steering wheel is extended relative to the cam shaft 10 and housing 12. The cap 40 can be rotated clockwise to screw the bolt 37 forwardly and create pressure between the engaging surfaces of the cam shaft 10 and the wedge 35. Counterclockwise rotation of the cap 40 will release the wedge 35 from the cam shaft 10 and allow the quill shaft 31 to extend or contract relative to the cam shaft 10.

The drive from the steering wheel 7 is transmitted through the quill shaft 31 through the key 41 to key slot 141 of the wedge 35 and through the engaging surfaces between the locking element 35 and the cam shaft 10. The cam shaft 10 is rotatably mounted in the bearing 42 which is embraced by the bearing support 43 which in turn is fastened to U-shaped bracket 44 on the inner periphery of the housing 12. The cam shaft 10 drives through the universal joint 9 which connects the cam shaft 10 to the steering shaft 4. The steering shaft 4 is rotatably supported within the bearing 46 within the sleeve 11 of casing 1. Suitable brackets 47 and 48 support the steering column on the instrument panel and firewall.

The cap 40 being integral with the sleeve 51 extends into the steering column. The sleeve 51 is formed with an annular recess 49 which receives the set screw 50 to retain the cap on the end of the steering column. When the cap releases the locking mechanism 32, the steering column is free to extend or contract. The cup 26 will slide relative to the housing 12 when the steering column is contracted or extended, respectively. As the steering column is extended or contracted, the head 38 will always remain within the hexagonal opening 39 of the sleeve 51. The housing 12 carries a U-shaped bracket 44 in its inner periphery which supports the flange 54 operating as a stop of snap ring 55 extending the steering column. The bushing 56 mounted on bracket 44 is retained in position by the snap ring 57 and rotatably supports the quill shaft 31. The sleeve 51 reciprocates with the quill shaft 31 when the steering column is extended or contracted while the bolt 57 remains with the wedge 35.

The operation of the device will be described in the following paragraphs.

The steering column 2 has a fixed portion 1 which is mounted on the firewall 103 and instrument panel 3 of the vehicle. The drive shaft 4 extends through the firewall and drives a suitable hydraulic steering motor and control valve for operating the steering mechanism. The steering wheel 7 drives through the universal joint 9 to control the valve and hydraulic steering motor. The upper portion 17 is pivotally connected to the lower portion 2 through the pivotal axis defined by the bolts 16 and 15. The pivotal locking lever 18 fixes the position of the pivot by the control knob 20 which is fastened when the stud 21 is suitably positioned in the slot 22. Infinite positioning of the steering mechanism in the slot 22 is provided through the control knob and slot.

Figure 2:
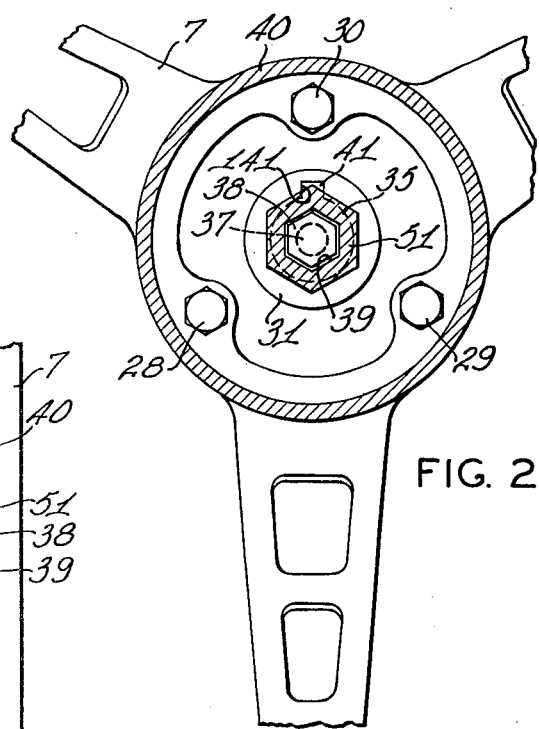
FIG. 2 is a cross section view of the steering column taken on line II—II of FIG. 5 showing the steering wheel and the cap on the steering column for releasing and locking of the extension mechanism.
Figure 3:
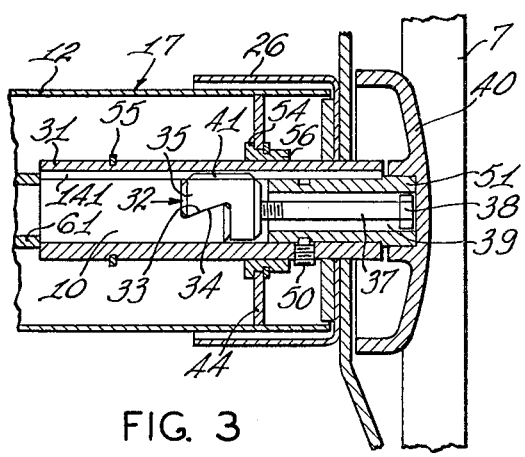
FIG. 3 is a section view of the steering column, showing the locking mechanism.

The upper portion 17 of the steering column 2 contains the axially adjustable mechanism for extending and contracting the steering column. This is accomplished through rotation of the button or cap 40 by releasing the locking surfaces 33 and 34 as the bolt is rotated in a counterclockwise direction permitting the locking element 32 to move toward the cam shaft 10. By releasing the locking mechanism 32, the sleeve 31 can be extended relative to the cam shaft 10 to a suitable position for the operation. When the steering column is adjusted, the cap 40 is then rotated in a clockwise direction as viewed in FIG. 2 to bias the locking element 35 away from the cam shaft 10 and causing the two surfaces 34 and 33 to firmly press against each other and radially bias them to lock the cam shaft with the sleeve 31. Snap ring 55 engages the flange 54 in the extended position and the sleeve 31 engages the bushing 61 forming the inner race of the bearing 42. Accordingly, an infinite number of positions are available to the operator in extending and contracting the upper steering column within this range.

By constructing a steering column in this manner, the hydraulic steering motor can be positioned forwardly of the firewall which reduces noise generated within the cab and reduces the sound level at the operator station. The controls for operating the steering column to extend or contract the steering column and the control for pivotally raising and lowering the upper portion 17 of the steering column are readily available to the operator and can be conveniently adjusted.

The embodiments of the invention in which an exclusive property or privilege is claimed are defined as follows:

1. A steering mechanism for a vehicle having a firewall, and a steering valve and motor on the outside of said firewall, said mechanism comprising: a lower steering column portion fixedly mounted to extend through said firewall; a lower steering shaft portion rotatably mounted within said lower column portion and adapted to control said valve and motor; an upper steering column portion; means for pivotally mounting said upper column portion to said lower column portion for pivotal movement between a plurality of pivotal positions; means for manually locking said upper column portion in a selected one of said plurality of pivotal positions; an upper steering shaft portion rotatably mounted within said upper column portion; a universal joint connecting said upper and lower shaft portions about said pivotally mounting means; a quill shaft rotatably and slidably mounted in said upper column portion concentric to said upper shaft portion; a steering wheel fixed to said quill shaft; and means for releasably locking said upper shaft portion to said quill shaft whereby said steering wheel can be slidably adjusted between a plurality of operative positions, said releasibly locking means including cam means on said upper shaft portion, a reciprocating cam element mounted within said quill shaft, reciprocal movement of said cam element causing said cam means to force said cam element radially into engagement with said quill shaft for locking said upper shaft portion to said quill shaft, a cap rotatably mounted relative to said steering wheel, an elongated drive socket in said cap, and a screw member received in said drive socket and threadedly engaged with said cam element for reciprocation thereof whereby rotation of said cap in one direction releases said quill shaft from said upper shaft portion for slidable adjustment of said steering wheel, and rotation of said cap in the opposite direction locks said quill shaft to said upper shaft portion.

2. A steering mechanism for a vehicle as set forth in claim 1 wherein said screw member defines a bolt having a hexagonal head for reception in said drive socket of said cap.

3. A steering mechanism for a vehicle as set forth in claim 1 wherein said upper drive shaft and said cam element define cylindrical members received in said quill shaft for selectively locking and unlocking said upper drive shaft and quill shaft.

4. A steering mechanism for a vehicle as set forth in claim 1 wherein said cam element defines a keyway, said quill shaft defines a key slot, a key received in said keyway and key slot, said steering wheel driving through said quill shaft said key on said cam element and said shafts for driving said steering mechanism.

5. A steering mechanism for a vehicle as set forth in claim 1 wherein said quill shaft and said steering wheel define an integral structure, said cam element defines a wedge shaped member received in said quill shaft, said cam element defines a keyway, said quill shaft defines a key slot for receiving a key for driving through said cam element.

6. A steering mechanism for a vehicle as set forth in claim 1 wherein said pivotal mounting means includes a casing on said lower steering column portion, a housing on said upper steering column portion, said pivotal mounting means pivotally connecting said housing with said casing.

7. A steering mechanism for a vehicle as set forth in claim 1 wherein said screw member includes means to extend said cam element relative to said upper drive shaft to lock said quill shaft with said upper drive shaft.

8. A steering mechanism for a vehicle as set forth in claim 1 wherein said motor is a hydraulic steering motor.

9. A steering mechanism for a vehicle as set forth in claim 1 wherein said cap, said steering wheel and said quill shaft define an integral structure.

10. A steering mechanism for a vehicle as set forth in claim 1 wherein said quill shaft receives said cam element and said cam element threadedly receives said screw member thereby biasing said upper drive shaft to lock said upper drive shaft with said quill shaft.

* * * * *